US 11,785,307 B1

United States Patent
Roberts et al.

(10) Patent No.: US 11,785,307 B1
(45) Date of Patent: Oct. 10, 2023

(54) SYSTEMS AND METHODS FOR SYNCHRONOUS GROUP DEVICE TRANSMISSION OF LIVE STREAMING MEDIA AND RELATED USER INTERFACES

(71) Applicant: Discovery.com, LLC, New York, NY (US)

(72) Inventors: Brian F. Roberts, Dallas, TX (US); Chad Peltola, Fairfield, CT (US); Charles Robertson, Seattle, WA (US)

(73) Assignee: DISCOVERY.COM, LLC, New York, NY (US)

( * ) Notice: Subject to any disclaimer, the term of this patent is extended or adjusted under 35 U.S.C. 154(b) by 0 days.

(21) Appl. No.: 17/804,106

(22) Filed: May 26, 2022

(51) Int. Cl.
*H04N 21/4788* (2011.01)
*H04N 21/2187* (2011.01)
*H04L 65/612* (2022.01)
*H04N 21/258* (2011.01)

(52) U.S. Cl.
CPC ....... *H04N 21/4788* (2013.01); *H04L 65/612* (2022.05); *H04N 21/2187* (2013.01); *H04N 21/25891* (2013.01)

(58) Field of Classification Search
CPC ....... H04M 2203/2027; H04L 41/5093; H04L 65/612; H04N 21/2187; H04N 21/25891
See application file for complete search history.

(56) References Cited

U.S. PATENT DOCUMENTS

| | | | | |
|---|---|---|---|---|
| 10,498,794 | B1 * | 12/2019 | Keighran | H04L 65/612 |
| 2015/0304605 | A1 * | 10/2015 | Hartman | H04N 7/15 |
| | | | | 725/109 |
| 2018/0310031 | A1 * | 10/2018 | Sarkar | H04H 60/45 |
| 2019/0273954 | A1 * | 9/2019 | Evans | H04N 21/25883 |

* cited by examiner

*Primary Examiner* — Ngoc K Vu

(74) *Attorney, Agent, or Firm* — Bookoff McAndrews, PLLC

(57) ABSTRACT

Systems and methods for interacting with an enhanced live multimedia stream are disclosed. One method may include: presenting a plurality of live media streaming options, wherein at least a subset of the plurality of live media streaming options comprise one or more features enabling enhanced interaction between users; receiving an indication to join a general virtual media streaming session associated with one of the subset; retrieving a first user profile associated with a first user; connecting the first user profile to the general virtual media streaming session; transmitting, to the first user device via a multimedia streaming platform, the live multimedia stream playing in the virtual media streaming session; identifying one or more points in the live multimedia stream at which to implement the one or more features enabling enhanced interaction between users; and implementing at least one of the one or more features in the virtual media streaming session.

18 Claims, 14 Drawing Sheets

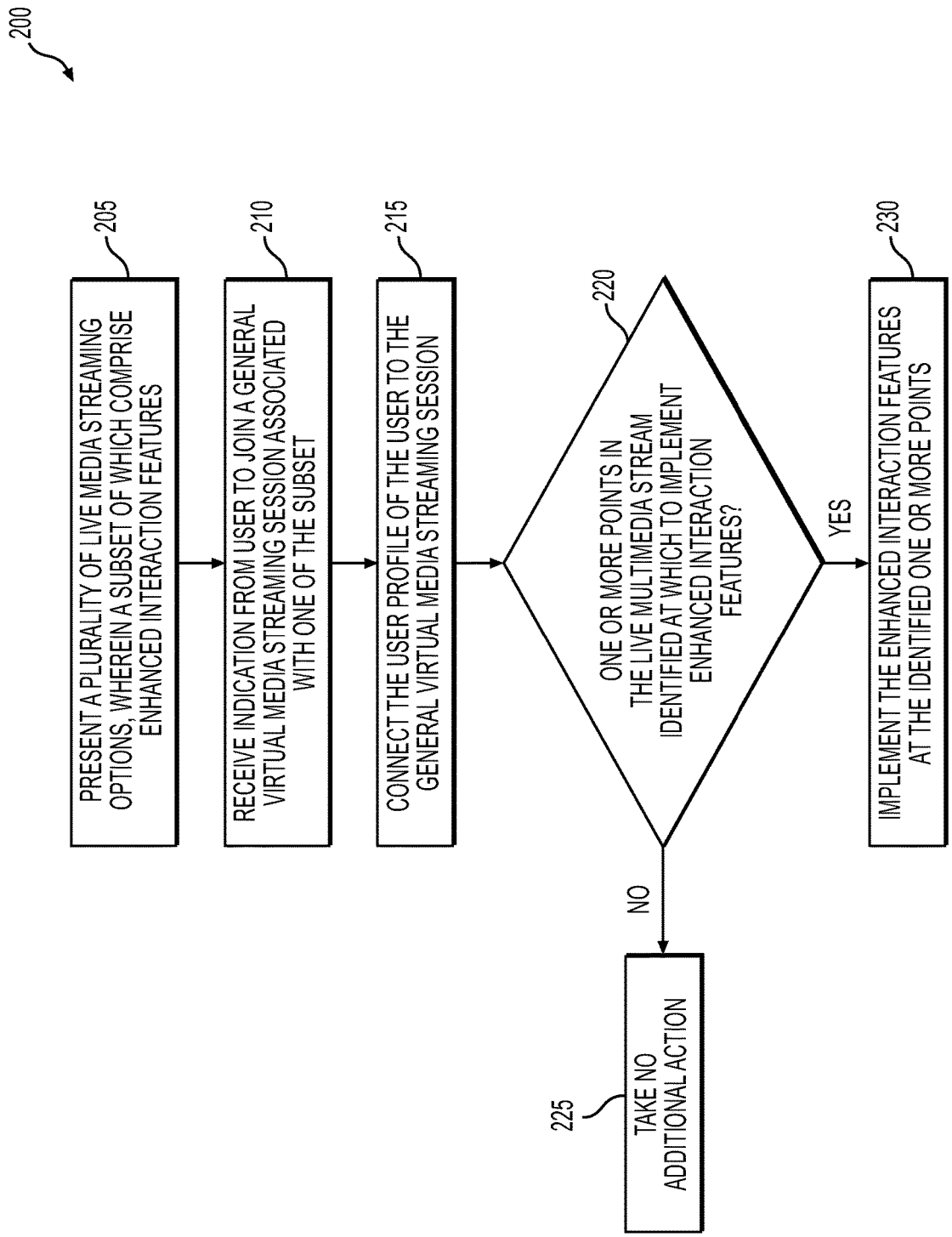

US 11,785,307 B1

SYSTEMS AND METHODS FOR SYNCHRONOUS GROUP DEVICE TRANSMISSION OF LIVE STREAMING MEDIA AND RELATED USER INTERFACES

TECHNICAL FIELD

Various embodiments of the present disclosure relate generally to the field of live multimedia content streaming, and, more particularly, to enabling users of a media streaming application platform to engage and interact with others viewing a live multimedia stream.

BACKGROUND

With the rapid rise of at-home entertainment, many individuals may more easily access and interact with a vast array of multimedia content, such as television shows, films, documentaries, and the like, via, for example, subscription-based media streaming platforms. Individuals may have more control over the content they watch, how they watch it, and where they choose to watch it from. However, despite the many options and comforts that come with video streaming services, for some individuals, the content consumption experience may be isolating or limiting if they, for example, live alone or if their friends live far away. For others, the content consumption experience may be limited to a small group of people, such as, for example, the people they live with (e.g., roommates, family members).

One significant part of the multimedia consumption experience may be the ability to share one's viewing experience with other people. Enabling individuals to engage in a remote (e.g., virtual) shared viewing may allow individuals to open up and connect with one another as they take part in the same viewing experience. The present disclosure is accordingly directed to optimizing the shared viewing experience with respect to live streaming events.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for interacting with an enhanced multimedia live stream.

In summary, one aspect provides a method for interacting with a live multimedia stream using a server in network communication with at least one database, the method comprising operations including: presenting, for user selection on a multimedia streaming platform associated with the server, a plurality of live media streaming options, wherein at least a subset of the plurality of live media streaming options comprise one or more features enabling enhanced interaction between users; receiving, from a first user device associated with a first user, an indication to join a general virtual media streaming session associated with one of the subset; retrieving, subsequent to the receiving and from the at least one database, a first user profile associated with the first user; connecting, subsequent to the retrieving, the first user profile to the general virtual media streaming session; transmitting, to the first user device via the multimedia streaming platform, the live multimedia stream playing in the virtual media streaming session; identifying, using a processor associated with the server, one or more points in the live multimedia stream at which to implement the one or more features enabling enhanced interaction between users; and implementing, responsive to the identifying and in the virtual media streaming session, at least one of the one or more features.

Another aspect provides a system for interacting with a live multimedia stream, the system including: at least one database; a server in network communication with the at least one database, the server configured to perform operations including: presenting, for user selection on a multimedia streaming platform associated with the server, a plurality of live media streaming options, wherein at least a subset of the plurality of live media streaming options comprise one or more features enabling enhanced interaction between users; receiving, from a first user device associated with a first user, an indication to join a general virtual media streaming session associated with one of the subset; retrieving, subsequent to the receiving and from the at least one database, a first user profile associated with the first user; connecting, subsequent to the retrieving, the first user profile to the general virtual media streaming session; transmitting, to the first user device via the multimedia streaming platform, the live multimedia stream playing in the virtual media streaming session; identifying, using a processor associated with the server, one or more points in the live multimedia stream at which to implement the one or more features enabling enhanced interaction between users; and implementing, responsive to the identifying and in the virtual media streaming session, at least one of the one or more features.

A further aspect provides a non-transitory computer-readable medium storing computer-executable instructions which, when executed by a server in network communication with at least one database, cause the server to perform operations including: presenting, for user selection on a multimedia streaming platform associated with the server, a plurality of live media streaming options, wherein at least a subset of the plurality of live media streaming options comprise one or more features enabling enhanced interaction between users; receiving, from a first user device associated with a first user, an indication to join a general virtual media streaming session associated with one of the subset; retrieving, subsequent to the receiving and from the at least one database, a first user profile associated with the first user; connecting, subsequent to the retrieving, the first user profile to the general virtual media streaming session; transmitting, to the first user device via the multimedia streaming platform, the live multimedia stream playing in the virtual media streaming session; identifying, using a processor associated with the server, one or more points in the live multimedia stream at which to implement the one or more features enabling enhanced interaction between users; and implementing, responsive to the identifying and in the virtual media streaming session, at least one of the one or more features.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts an exemplary flowchart of a method of enabling interaction exchange between users in a virtual media streaming session associated with an enhanced live event, according to one or more embodiments.

DETAILED DESCRIPTION OF EMBODIMENTS

Figure 1:
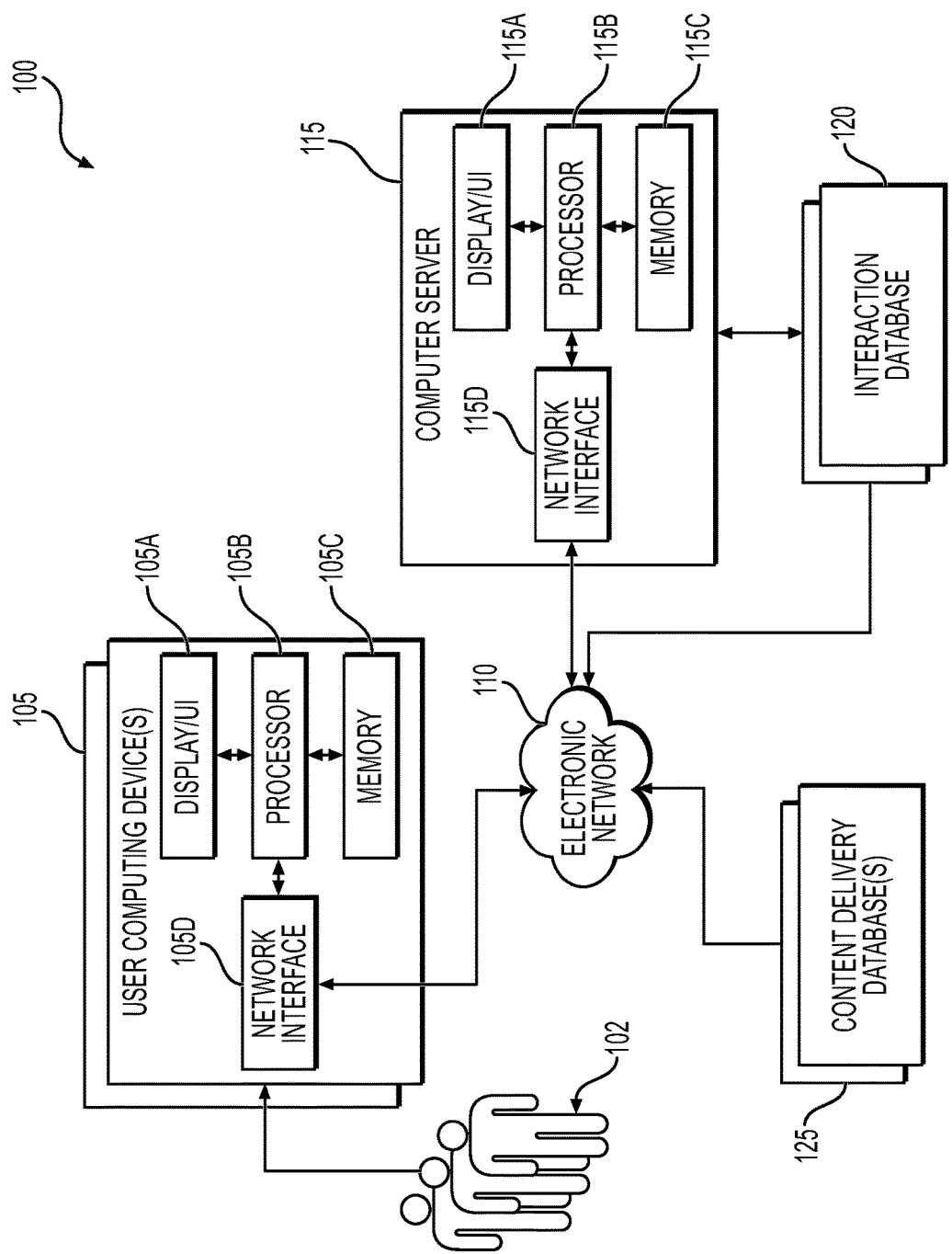
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "user", "subscriber," and the like generally encompasses consumers who are subscribed to a streaming service (e.g., streaming platform) associated with the system described herein. The term "streaming service" (e.g., streaming platform) may refer to subscription-based video-on-demand (SVoD) services such as television shows, films, documentaries, and the like. The term "user" may be used interchangeably with "user profile," "profile," and the like throughout this application. The phrase "linking users" may be used interchangeably with "linking user profiles" and the like throughout this application. The phrase "registered with" may be used interchangeably with "subscribed to" and the like throughout this application. The phrase "multimedia content" or "media content" may be used interchangeably with "multimedia content item" and the like throughout this application.

In the following description, embodiments will be described with reference to the accompanying drawings. As will be discussed in more detail below, in various embodiments, systems and methods for synchronous group consumption of streaming media are described.

Application platforms exist today that attempt to duplicate the real-life group-based viewing experience. More particularly, many popular media-streaming services provide users with an option to view multimedia content with one or more other individuals in a virtual setting (e.g., a virtual room). Participants involved in this shared experience may each view the same article of media content substantially simultaneously (i.e., using their own electronic devices). Such a feature may ultimately improve an individual's content consumption experience by providing a social component that they otherwise would not have by streaming media using conventional means.

Some individuals, however, may want a viewing experience that more closely resembles attendance at a large real life event (e.g., a sporting match, a show, a concert, etc.). Specifically, these individuals desire virtual room functionality that is able to more accurately duplicate the atmosphere generated by a large crowd, while still maintaining the personal interactions an attendee may have when attending the event with a group of friends. Although a variety of application platforms exist today that enable individuals to communicate with one another in a group, these features fall short of effectively simulating the desired aforementioned viewing environment.

To address the above-noted problems, the present disclosure describes a system that can expand the nature of interactions that participants may have with others while viewing a live broadcast. More particularly, the system may enable individuals connected to a general user pool associated with a live broadcast to exchange various types of input with one another (e.g., comments, emoticons, reactions, a combination thereof, etc.). Additionally, the system may enable individuals connected to the user pool to further create a private shared experience (sometimes referred to as a "shared stream," "streaming session," or "party") in which they can privately communicate and interact with those designated people (e.g., their friends, etc.). Furthermore, the system may enable individuals connected to the user pool to participate in games or joint experiences that may be associated with the events occurring during the live broadcast.

In an exemplary use case, a server associated with the system may establish a virtual media streaming session. The virtual media streaming session may be a digital space in which groups of individuals may virtually gather to synchronously view a live article of multimedia content. In the context of this application, "synchronous viewing" refers to a situation in which an article of multimedia content is viewed simultaneously by each member in the viewing party. Specifically, a chosen live multimedia stream may be simultaneously presented on devices associated with each user profile connected to the virtual media streaming session. A virtual media streaming session may be established by the server for some or all live events presented through an application platform. Subscribers to the application platform may join the virtual media streaming session associated with a particular live broadcast by selecting a "join" option or, alternatively, by accepting an invite sent from another attendee.

The participants to the live multimedia stream may provide input (e.g., text-based comments, emoticons, like or dislike reactions, etc.) using their own devices that may then be presented to some or all of the other participants. In an embodiment, participants may view the live multimedia stream and provide input using a single device. Alternatively, in another embodiment, participants may utilize a combination of devices to optimize their shared viewing experience (e.g., a participant may view the live multimedia stream on a first device, such as their television, and utilize a second device, such as their smart phone, to provide input). In an embodiment, the input may be presented chronologically (i.e., in the order that it is received by the server) and/or may be co-displayed with the live multimedia stream (e.g., in an unobtrusive portion of the screen, in a designated chat window, etc.). In an embodiment, participants may provide an input using various means. For example, participants can utilize a conventional input device such as a remote control, stylus, and/or digital keyboard to type a comment. Additionally or alternatively, participants can provide audible input to their device that can thereafter be processed by the server and be converted to text-based input. In an embodiment, participants may be enabled to select and send reactions by, for example, long pressing a "select" icon, scrolling through an available list of reactive emoticons, and then submitting the reaction by pressing the "select" icon again.

Participants involved in the virtual media streaming session may choose to create a sub-group (i.e., a "private watch party") within the larger participant pool. Input shared within the sub-group may remain private between the sub-group members; however, the sub-group members may still be able to see input shared in the general chat. In an embodiment, options may be available that may enable a sub-group member to easily switch between a public chat associated with the general participant pool and a private chat associated with the sub-group.

The virtual media streaming session may contain a variety of "joint experiences" that the participants engaged with the live broadcast may encounter. For example, the participants may play games, engage in activities, and/or utilize specialized inputs that may be associated with the content presented in the live broadcast. Non-limiting examples of these types of joint experiences include participation in a virtual group "wave" activity, participation in a joint sound experience, selection of dynamically modified inputs based on occurrences in the live broadcast, exposure to preconfigured animations, and the like.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

FIG. 1 is a diagram depicting an exemplary block diagram of a system environment 100 for enabling synchronous group consumption of live multimedia content between at least two users, according to one or more embodiments of the present disclosure. The system environment 100 may include two or more user computing devices 105 operated by users 102, an electronic network 110, a computer server 115, an interaction database 120, and one or more content delivery databases 125. One of skill in the art would recognize that the server 115 may configure the one or more user computing devices 105 so as to experience different functionalities and/or have access to different information (e.g., determined by credentials such as user ID/password).

The user computing devices 105, the computer server 115, the interaction database 120 and/or the content delivery databases 125 may be connected via the network 110, using one or more standard communication protocols. The computer server 115 may be configured to receive data over the network 110 from the user computing devices 105, including, but not limited to, requests to invite others to a shared viewing experience in a private watch party associated with a virtual media streaming session (e.g., invite requests) and responses to the invite requests. "Interaction data" includes data received from the user computing devices 105 as well as data generated and analyzed by the computer server 115. Interaction data may be stored in the interaction database 120, and may include information as to which users/user profiles are present in a virtual media streaming session, the live multimedia content (e.g., sports, movies, shows, documentaries, etc.) presented in the virtual media streaming session, communications (e.g., reactions, comments, favorites) shared between users in the virtual media streaming session while watching the shared content, and notifications generated and transmitted by the computer server 115 to users. The computer server 115 may store the interaction data received over the network 110 in the interaction database 120.

In one or more embodiments, the computer server 115 and the interaction database 120 may be one server computer device and a single database, respectively. Alternatively, in one or more embodiments, the server 115 may be a server cluster, or any other collection or network of a plurality of computer servers. The interaction database 120 also may be a collection of a plurality of interconnected databases. The server 115 and the interaction database 120 may be components of one server system. Additionally, or alternatively, the server 115 and the interaction database 120 may be components of different server systems, with the network 110 serving as the communication channel between them. The computer server 115, the interaction database 120, and/or the content delivery databases 125 may be associated with an entity 130, such as a subscription-based streaming service provider (not shown). In some embodiments, the computer server 115, the interaction database 120, and/or the content delivery databases 125 may collectively be referred to as an entity system.

As shown in FIG. 1, the computer server 115 may be in communication with the user devices 105 to transmit and receive messages from each other across the network 110. The user devices 105 may be associated with users who are subscribed to a streaming service platform provided by the computer server 115. The network 110 may comprise one or more networks that connect devices and/or components of environment 100 to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, the network 110 may be implemented using cell and/or pager networks, satellite, licensed radio, or a combination of licensed and unlicensed radio. The network 110 may be associated with a cloud platform that stores data and information related to methods disclosed herein.

The user computing device 105 may include a display/user interface (UI) 105A, a processor 105B, a memory 105C, and/or a network interface 105D. The user computing device 105 may be a personal computer (PC), a tablet PC, a set-top box (STB), a streaming device (e.g., Apple TV®, Amazon Fire®, Roku® player, Google Chromecast®), a television (TV), a smart TV, a gaming console, a personal digital assistant (PDA), a mobile device, a palmtop computer, a laptop computer, a desktop computer, etc. The user computing device 105 may execute, by the processor 105B, an operating system (O/S) and at least one application (each stored in memory 105C). The application may be a browser program or a mobile application program (which may also be a browser program in a mobile O/S). The application may generate one or more interactive graphic user interfaces (GUIs), such as, for example, the exemplary GUIs shown in FIGS. 3-11, based on instructions/information received from the server 115. In some embodiments, the application may generate one or more interactive GUIs based on instructions/information stored in the memory 105C. The interactive GUIs may be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 1056, while executing the application, may receive user inputs from the display/UI 105A, and perform actions or functions in accordance with the application.

The computer server 115 may include a display/UI 115A, a processor 115B, a memory 115C, and/or a network interface 115D. The server 115 may be a computer, system of computers (e.g., rack server(s)), and/or or a cloud service computer system. The server 115 may execute, by the processor 1156, an operating system (O/S) and at least one instance of a server program (each stored in memory 115C). The server 115 may store or have access to information from interaction database 120 and content delivery databases 125. The display/UI 115A may be a touch screen or a display with other input systems (e.g., mouse, keyboard, etc.) for an operator of the server 115 to control the functions of the server 115 (e.g., update the server program and/or the server information). The network interface 115D may be a TCP/IP network interface for, e.g., Ethernet or wireless communications with the network 110. The server program, executed by the processor 1156 on the server 115, may be configured to identify interaction partners that align with a user's mission(s) of interest, as will be described in further detail below.

As described above, the interaction database 120 may store data associated with users subscribed to a streaming service platform associated with the computer server 115. In addition to the interaction data, the interaction database 120 may also store additional data received from user computing devices 105, including real time and/or near real time location data (e.g., GPS data) of the user computing devices 105. The interaction database 120 may also store recommendations generated by the computer server 115, such as recommendations for a user to watch a certain show, movie, and/or other multimedia content based on the past viewing activity (e.g., viewing history) of other user(s) to which the user is linked to (e.g., that a user is friends with on the streaming platform).

The interaction database 120 may also store user profiles generated by the computer server 115 for the users 102. In some embodiments, the information described above, including the interaction data and any additional data received from user computing devices 105, may be stored in a plurality of user profiles within the interaction database 120. Each user profile may correspond to each user 102 in communication with the server 115. A user 102 may have multiple user computing devices 105 registered with the server 115 based on the user's 102 viewing habits and/or preferences. For example, one user may register a personal laptop, a smart TV, and a mobile device with the server 115. Information associated with registered user computing device(s) 105 and the user's 102 viewing habits and/or viewing preferences may all be stored within the user's user profile.

In some embodiments, in addition to the interaction data, each user profile may also include information associated with a respective user and their user computing device(s) 105 (e.g., a device identifier, device type), the user's name, a username or a nickname provided by the user for the user profile, content viewing preferences provided by the user, recommendations provided to the user by the server 115, the user's past viewing activity, IP addresses and locations (as well as accompanying dates and times) from where the user has logged in from, and/or user analytics generated by the server 115. In these embodiments, the user profiles may be updated to reflect a corresponding user's recent activities with another user, including sending or accepting an invite request.

In the system environment 100, the computer server 115 may retrieve multimedia content requested by users from the content delivery databases 125 to enable requested content to be streamed by users on the user computing devices 105. The content delivery databases 125 may store volumes of multimedia content items, including, for example, video series, movies, documentaries, and additional programming content that may be streamed by users 102 on the user computing devices 105. In some embodiments, the content delivery databases 125 may be maintained by third party content providers. In other embodiments, the content delivery databases 125 may be maintained by the server 115 and/or additional servers associated with the server 115.

FIG. 2 depicts an exemplary flowchart 200 for enabling interaction exchange between participants engaged in a virtual media streaming session for an enhanced live event. The exemplary process flow 200 may be implemented by system environment 100, which includes user computing devices 105 associated with users 102, computer server 115, interaction database 120, and content delivery databases 125 (all shown in FIG. 1).

At step 205, an embodiment may present, e.g., on a multimedia streaming platform, a plurality of live media streaming options for user selection. In an embodiment, selection of any of the plurality of live media streaming options may enable a user to join a virtual media streaming session in which they may be able to stream/view a live article of multimedia content substantially simultaneously with one or more other individuals. In an embodiment, a subset of the plurality of live media streaming options may contain one or more features that enable enhanced interaction between users, as further described herein. More particularly, selection of one of the subset of live streaming options may place a user into a virtual media streaming session in which one or more those enhanced interaction features are supported. Non-limiting examples of live multimedia articles that may be enhanced include sporting matches, concert broadcasts, news broadcasts, award show broadcasts, reality television shows, and the like.

At step 210, an embodiment may receive an indication from a user to join a virtual media streaming session associated with a live article of multimedia content. In an embodiment, a virtual media streaming session may be automatically created for each live multimedia article. Alternatively, in another embodiment, a virtual media streaming session may only be created for designated live multimedia articles. In an embodiment, each of the live media streaming options that support enhanced interaction features may be accompanied by a corresponding indication (e.g., as illustrated by icon 305 in FIG. 3A designating the instant media streaming option as "Enhanced").

In an embodiment, the indication to join a virtual media streaming session associated with an enhanced live multimedia article may be derived from a user's selection to view the enhanced live multimedia article. More particularly, each time a user chooses to view an enhanced live multimedia article, their user profile is automatically connected to a virtual media streaming session. Alternatively, in another embodiment, a user may choose to view an enhanced live multimedia article without automatic connection of their user profile to the virtual media streaming session. In such a situation, the user profile is only connected to a virtual media streaming session upon explicit designation by the user.

At step 215, an embodiment may connect, using computer server 115, a user profile associated with the user to the virtual media streaming session. In this regard, an embodiment may retrieve (e.g., from a database accessible to the computer server 115, etc.) a user profile associated with the user and connect that user profile to the virtual media streaming session. In an embodiment, the virtual media streaming session may contain indications of other user profiles that have also connected to the virtual media streaming session. Once connected, the computer server 115 may transmit the live multimedia article playing in the virtual media stream to the user. In an embodiment, the live multimedia article may be synchronously viewable by each of the other user profiles connected to the virtual media streaming session in a shared viewing experience. In an embodiment, connected user profiles may be enabled to interact with one or more of the connected participants. More particularly, inputs (e.g., comments, reactions, etc.) provided by any participant in the virtual media streaming session may be visible by any of the other participants.

At step 220, an embodiment may determine whether one or more points exist in the live multimedia stream at which to implement various types of enhanced interaction features. In an embodiment, non-limiting examples of enhanced interaction features may include a creation of a private watch party within a general virtual media streaming session and/or implementation of various types of joint experiences (e.g., games, activities, modified input abilities, etc.). In an embodiment, the one or more points may be identified in response to explicit user actions (e.g., a user request to create a private watch party, etc.) or may be identified dynamically (e.g., by analysis of the content in the live multimedia article, etc.)

Responsive to determining, at step 220, that no points in the multimedia stream have been identified at which to implement one or more enhanced interactions features, an embodiment may, at step 225, take no additional action. More particularly, an embodiment may continue to enable a user to view and/or conventionally interact with the live multimedia article in the general virtual media streaming session. Conversely, responsive to determining, at step 220, that one or more points in the live multimedia stream at which to implement enhanced interaction features have been identified, an embodiment may, at step 230, implement one or more enhanced interaction features at the identified points. In an embodiment, the selection of the number and/or types of enhanced interaction features to implement may be based on a context of events occurring in the live multimedia article, as further described herein.

Figure 3A:
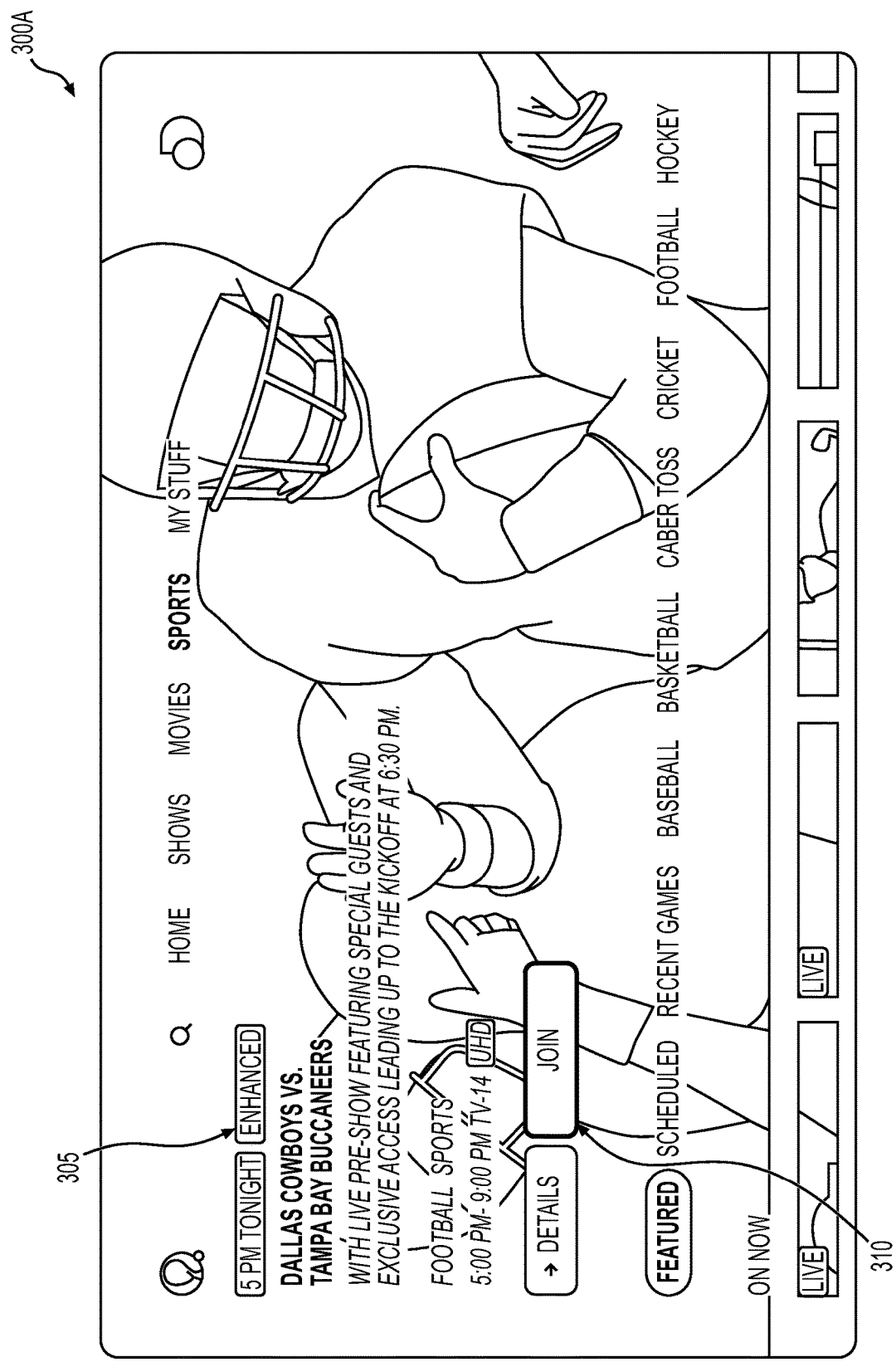
FIG. 3A depicts an exemplary interactive graphical user interface (GUI) for joining an enhanced live event, according to one or more embodiments.
Figure 3B:
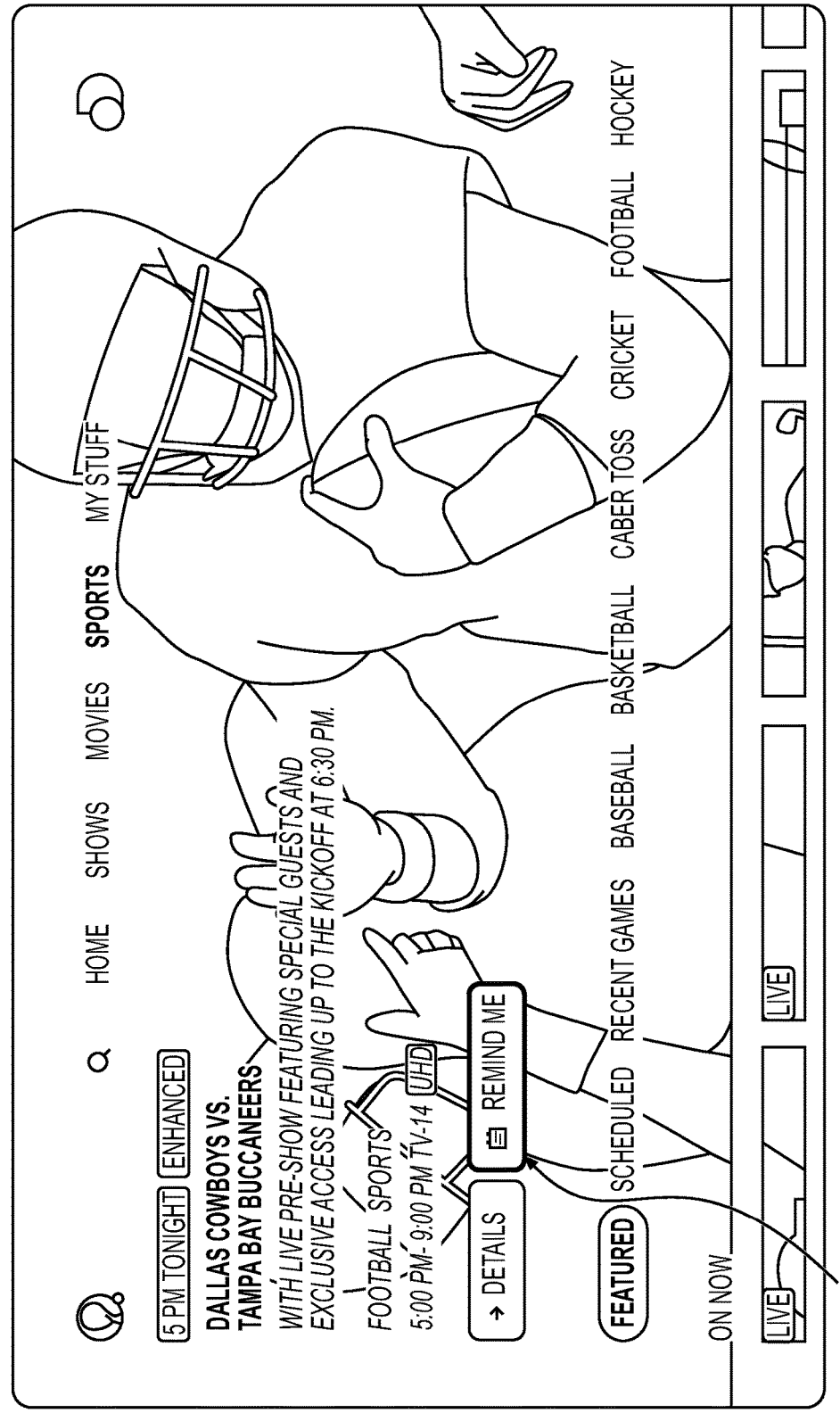
FIG. 3B depicts another exemplary interactive graphical user interface (GUI) for joining an enhanced live event, according to one or more embodiments.

Turning now to FIGS. 3(A-B), exemplary GUIs 300(A-B) depict non-limiting example implementations of ways in which users may connect to an enhanced live event. Referring first to exemplary GUI 300A in FIG. 3A, a user of a media streaming platform may identify enhanced multimedia articles by, for example, seeing an "enhanced" designation 305 situated proximate to the multimedia article. The user may subsequently join into a virtual media streaming session associated with the enhanced multimedia article by, for example, selecting a "Join" icon 310 situated proximate to the enhanced multimedia article. Alternatively, for an enhanced live event occurring at a future point in time, the user may choose to receive an indication when the enhanced live event starts. For instance, referring now to FIG. 3B depicting exemplary GUI 300B, a user may select a "Remind Me" icon 315 to request the computer server 115 to transmit a reminder to the user's profile when the live event starts. The reminder may be a push notification that is transmitted to a specific user device or a user device on which the media streaming platform is active. Responsive to receiving acceptance input on the push notification, the computer server 115 may connect the user's profile to the virtual media streaming session associated with the enhanced live event.

Figure 4:
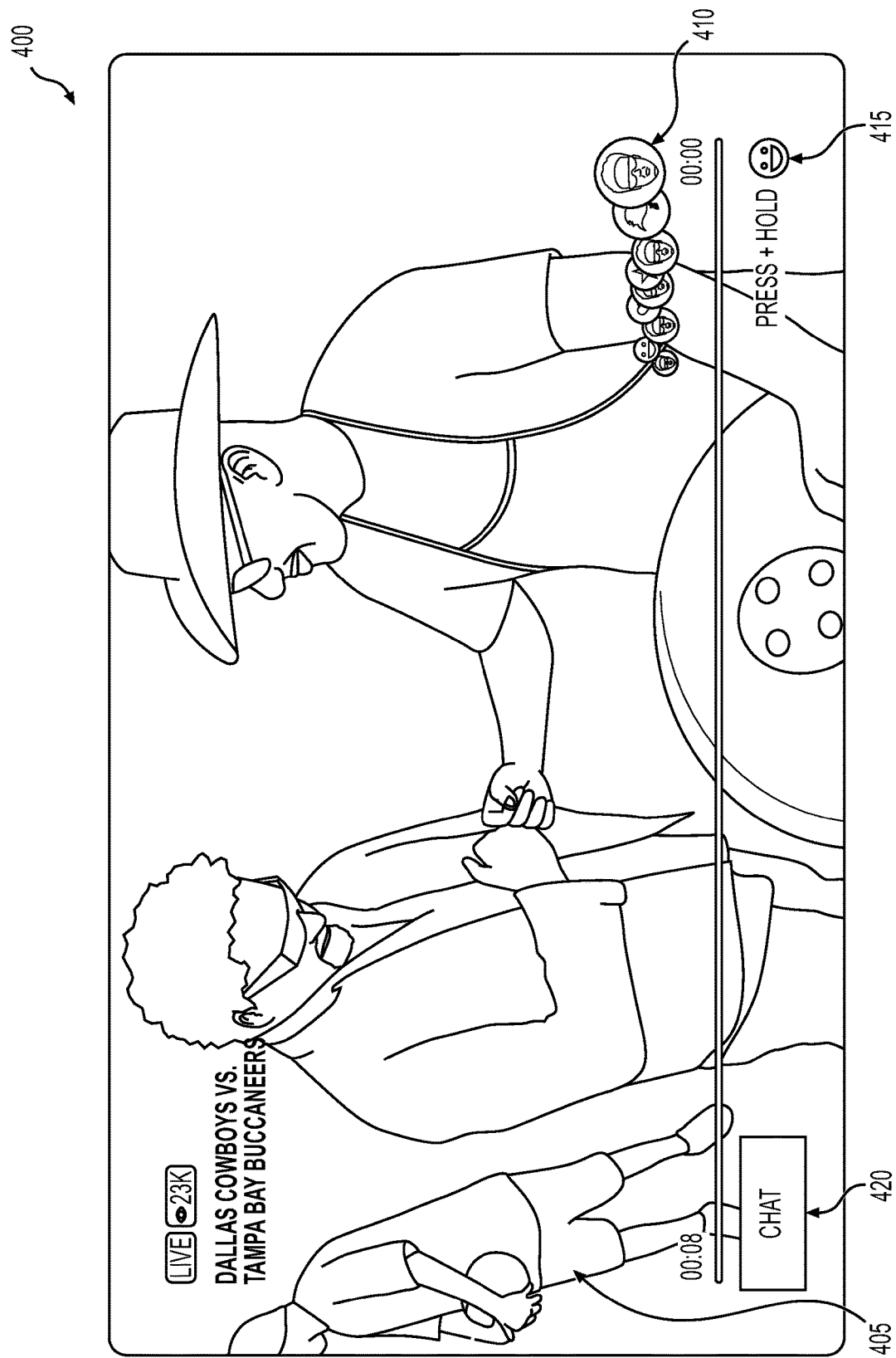
FIG. 4 depicts an exemplary interactive graphical user interface (GUI) for an enhanced live event, according to one or more embodiments.

Turning now to FIG. 4, exemplary GUI 400 depicts a non-limiting example implementation of an enhanced live event. As shown in GUI 400, a user profile connected to the virtual media streaming session associated with the enhanced live event may be able to synchronously view the live event 405 along with public input 410 (e.g., comments and/or emotive reactions) provided by other participants in the general viewing pool. A user may provide reaction input via interaction with emoticon icon 415 (e.g., by pressing emoticon icon 415 and thereafter selecting an available emoticon reaction) and/or may provide comment input via interaction with comment icon 420 (e.g., by typing using a keyboard, by selecting letters using a touchpad or remote, by providing voice input that may thereafter be converted to machine typeset, etc.). User-provided input may correspondingly be viewable by the other participants present in the general virtual media streaming session.

Situations may arise where a user may want to experience the enhanced live event with friends and/or known contacts rather than just with anonymous users that may be present in the general virtual media streaming session. In these situations, a user may create and invite known contacts to a private watch party. In an embodiment, the private watch party may be a "sub-group" within the virtual media streaming session in which a user and their invited connections may experience the live multimedia article in a more personal way, as further described herein. The indication to establish the private watch party may derive from transmission of an invite request (e.g., an invitation) from a first user (e.g., "user A") to a second user (e.g., "user B"). User B may be a designated "friend" or "contact" of user A on the streaming service platform whose profile may be easily accessible to user A via navigation through a "friends list." This invite request may be an invitation from user A to user B to join a private watch party in the virtual media streaming session. The invite request may be transmitted from user A's user computing device 105, and may identify a user (e.g., "user B") with whom user A wishes to invite to the virtual media streaming session. It is important to note that a first user can invite more than one other individual to the virtual media streaming session. The invitation of a single individual to the virtual media streaming session, as described here, is not intended to be limiting and is described as such purely for exemplary purposes. Upon detecting acceptance of the invite request, an embodiment may connect, using computer server 115, the user profiles associated with user A and user B to the private watch party associated with the virtual media streaming session.

Figure 5:
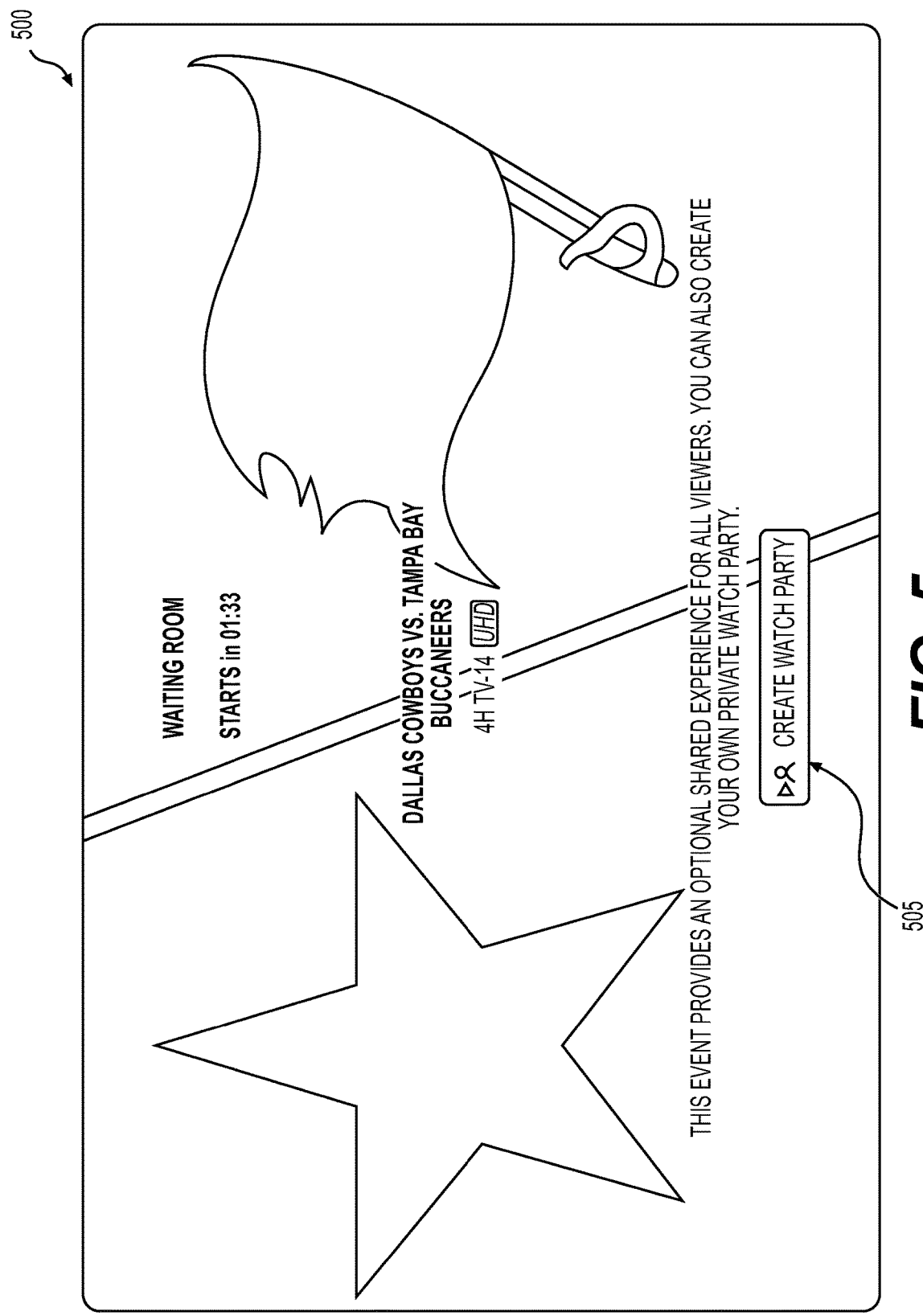
FIG. 5 depicts an exemplary interactive graphical user interface (GUI) for creating a private watch party for an enhanced live event, according to one or more embodiments.
Figure 6:
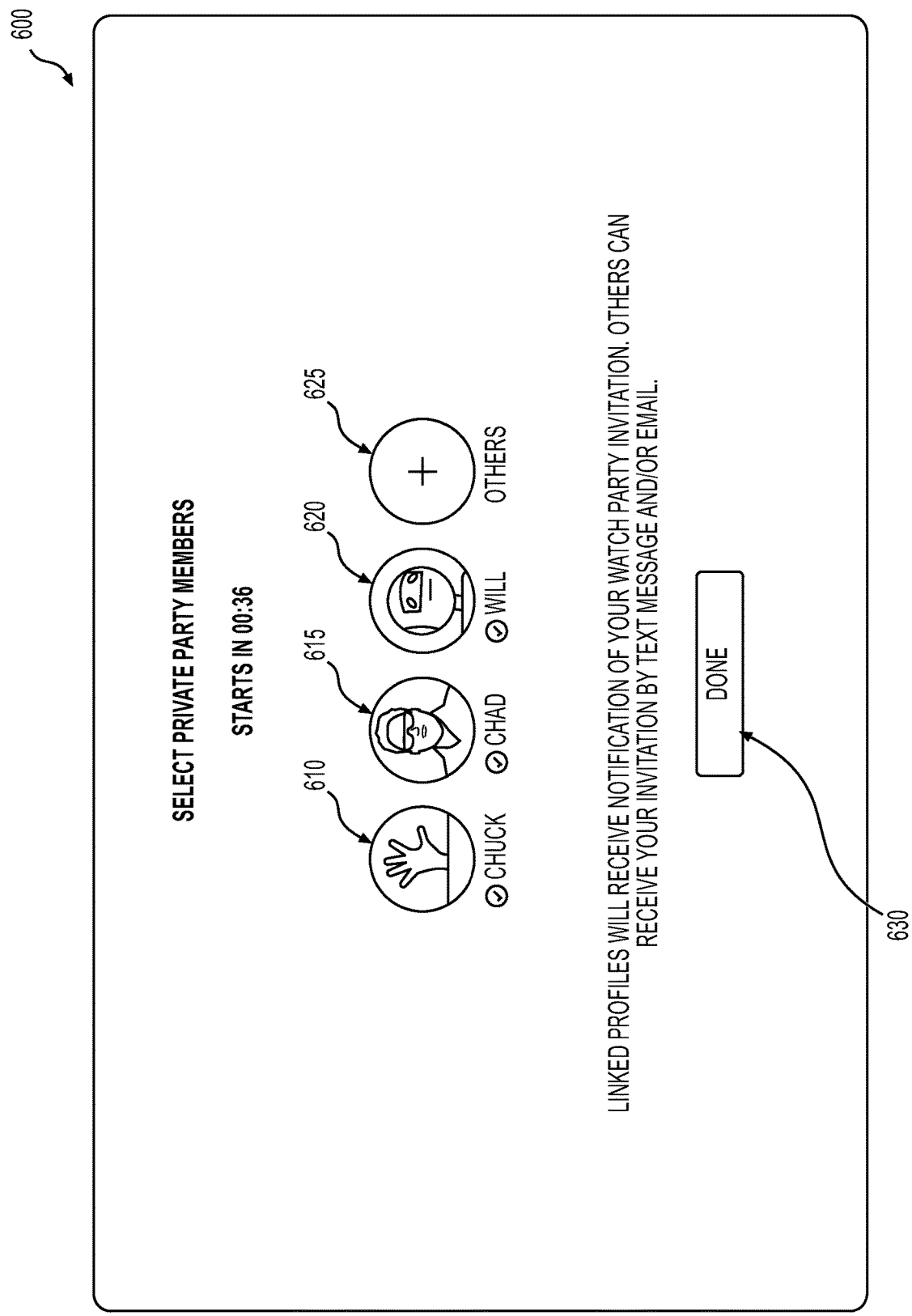
FIG. 6 depicts an exemplary interactive graphical user interface (GUI) for inviting known contacts to an enhanced live event, according to one or more embodiments.

As an example of the foregoing, turning now to FIG. 5, exemplary GUI 500 depicts a watch party creation screen that an individual may interact with to initiate a private watch party. The watch party creation screen may contain an indication of what multimedia article is associated with the enhanced live event and/or when it starts. Additionally or alternatively, the watch party creation screen may contain an option for a user to invite others to join their private watch party. More particularly, a user may select the "Create Watch Party" icon 505 to activate an invite screen, as depicted in the exemplary GUI 600 in FIG. 6.

With continued reference to exemplary GUI 600, from this screen, the user may select one or more users to invite to their private watch party. For instance, the invite screen depicted in GUI 600 provides profile icons 610, 615, and 620 for those users with whom the user is connected with. Additionally, exemplary GUI 600 includes an "Others" icon 625, which is configured to allow the user to search for and send a private watch party invite request to one or more additional connected contacts. Additionally or alternatively, upon selection of the "Others" icon 625, the computing server 115 may dynamically generate a list of suggested invitees that a user may choose from. The suggested invitees in the list may be those that the computer server 115 identifies as potentially being interested in the enhanced live event (e.g., by identifying a context associated with the enhanced live event and thereafter determining those individuals that may be interested in that context based upon an analysis of their available user data such as viewing history data, profile preference indication data, communication data, etc.). Upon selection of all desired invitees, the user may send a private watch party invite via interaction with icon 630. The computing server 115 may thereafter connect each user profile accepting the invite request to the private watch party.

Figure 7:
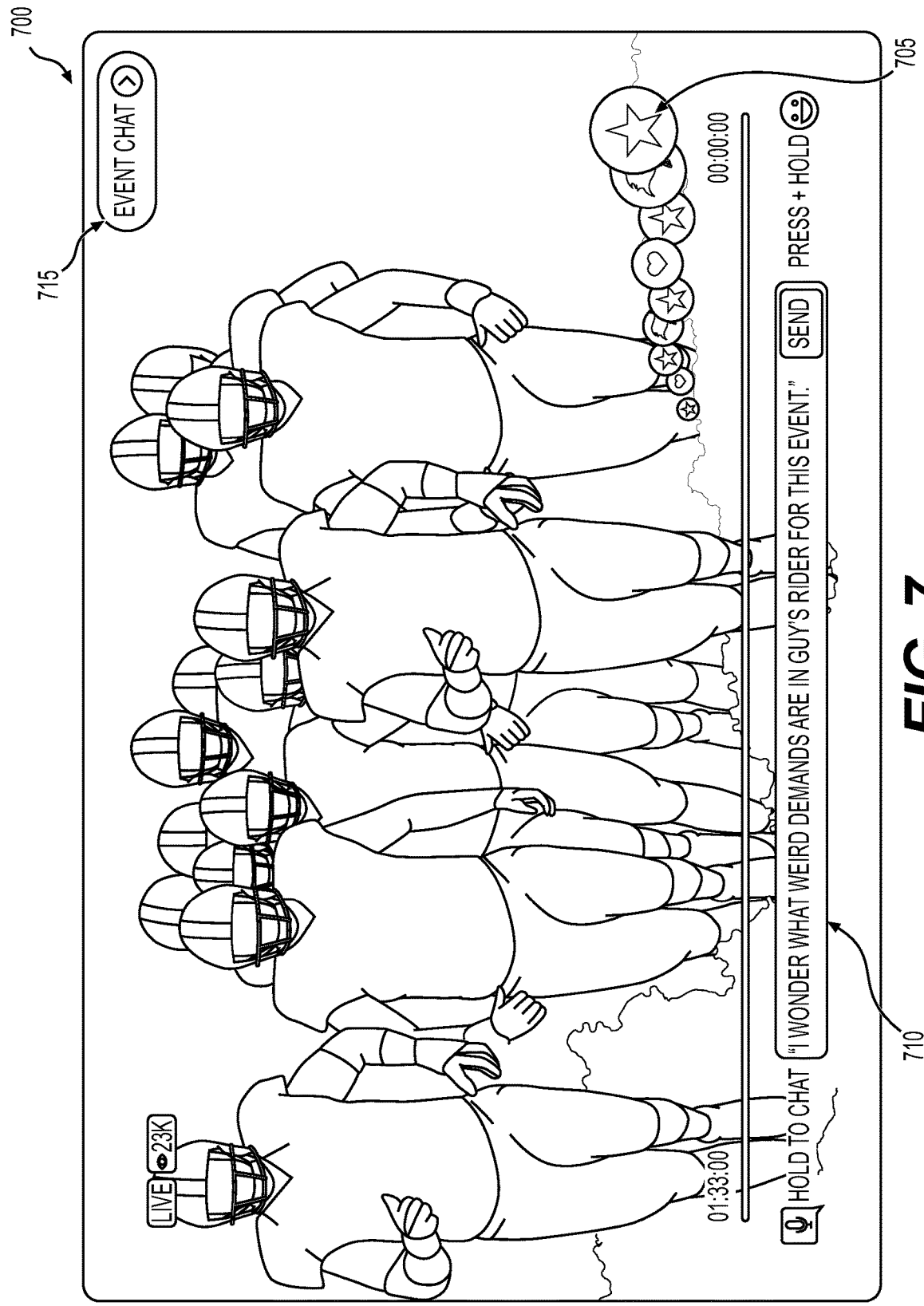
FIG. 7 depicts an exemplary interactive graphical user interface (GUI) for interacting within a private watch party associated with an enhanced live event, according to one or more embodiments.
Figure 8:
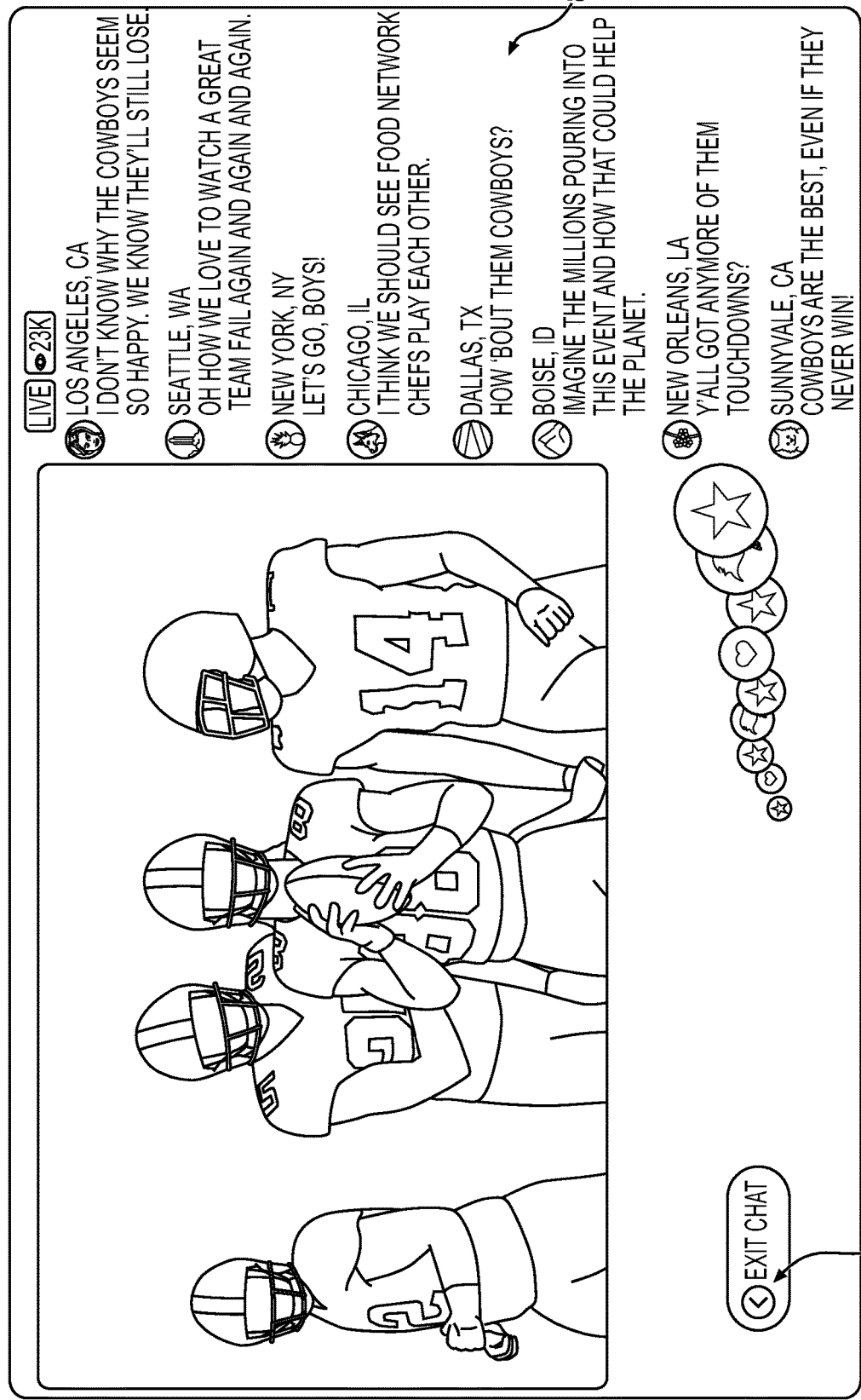
FIG. 8 depicts an exemplary interactive graphical user interface (GUI) for interacting within a private watch party associated with an enhanced live event, according to one or more embodiments.

Turning now to FIG. 7, an exemplary GUI 700 is depicted of a view from a private watch party. More particularly, individuals connected to the private watch party may watch the live event and see comments and reactions 705 provided by the general user pool in much the same way as depicted and described in FIG. 4 above. Additionally, the individuals connected to the private watch party may also be able to communicate with one another in a private chat 710 that is not visible to the general user pool. If desired, an event chat icon 715 may be selected that may take the individuals to the general chat, as depicted in exemplary GUI 800 in FIG. 8. Here, individuals may view the public commentary of the live broadcast (e.g., in a public chat box 805) and switch back to the private chat whenever they choose via selection of "exit chat" icon 810.

In an embodiment, the computer server 115 may be configured to dynamically inform late attendees to the private watch party of one or more notable events, or "highlights", which occurred in the private watch party prior to their arrival. In an embodiment, events that may be considered notable may include: a single communication from one attendee to one or more other attendees in the private watch party, a topic of a conversation discussed between attendees in the private watch party (i.e., as dynamically determined by the computer server 115 using one or more conventional conversational analysis techniques, etc.), reactions to comments exchanged between attendees and/or reactions to events occurring in the live multimedia article (e.g., reactions to an occurrence in a game, etc.), and the like. In an embodiment, the computer server 115 may be configured to provide the notable events to each individual that joins the private watch party after the private watch party has been active for a predetermined period of time (e.g., 15 minutes, 30 minutes, 1 hour, etc.) and/or after a predetermined number of events have been detected within it (e.g., 5 events, 10 events, etc.). In an embodiment, computer server 115 may provide an indication of these notable events to the late attendee in one or more different ways. For example, an individual may be presented with a summarized list of notable events upon their arrival to the private watch party (e.g., presented to the late attendee in the private watch party chat, etc.). As another example, an individual may be presented with a stitched highlight reel of notable events that may play for the late attendee as an intro sequence before they are connected to the main shared event multimedia stream.

Individuals connected to a public or private watch party associated with the enhanced live event may engage in different types of joint experiences. These experiences may range from participation in games or activities, utilization of dynamically created input types, exposure to preconfigured animations, and the like. A plurality of non-limiting exemplary types of joint experiences are described below and correspondingly illustrated in FIGS. 9-11.

Figure 9:
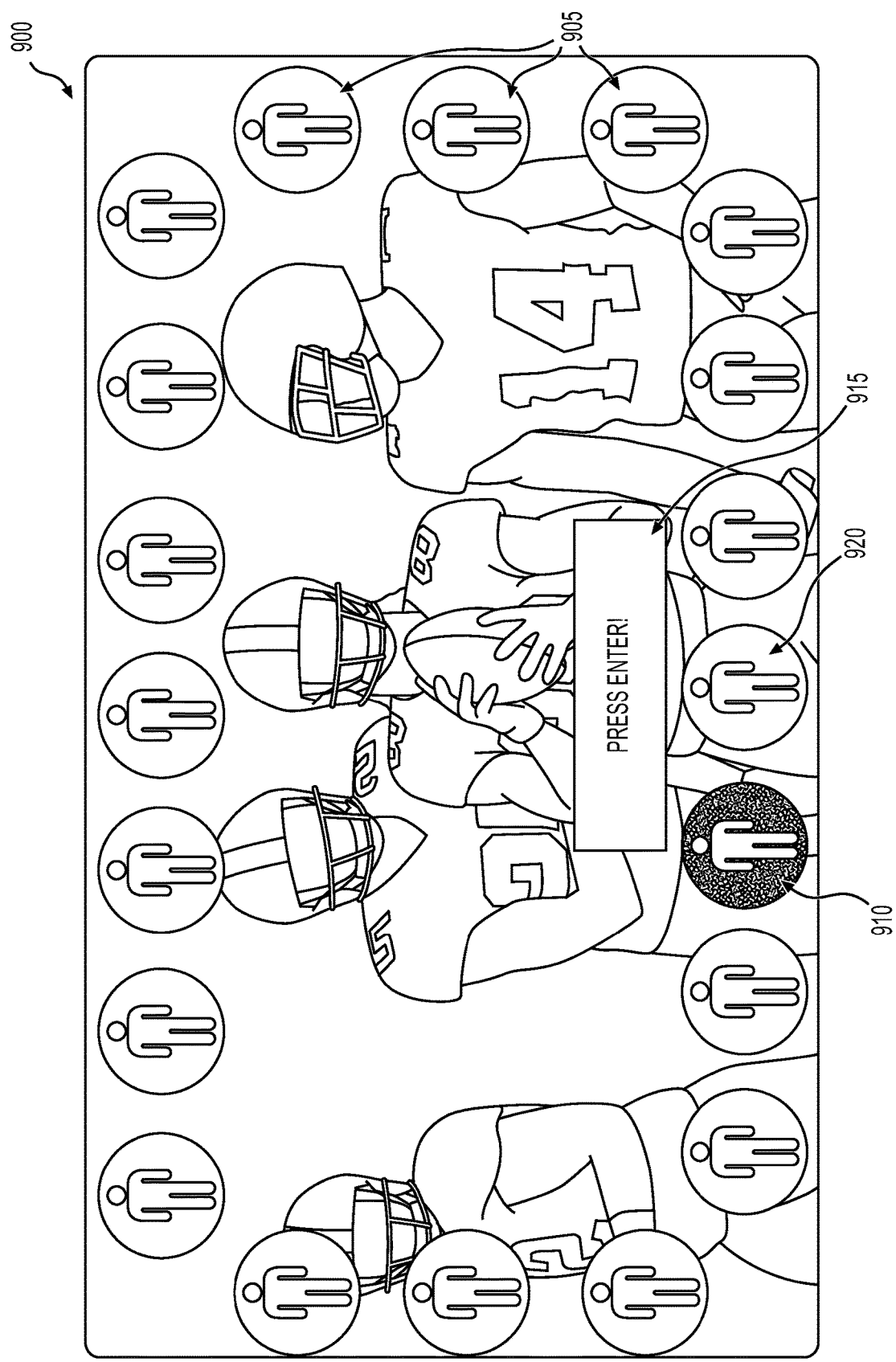
FIG. 9 depicts an exemplary interactive graphical user interface (GUI) for engaging in a joint experience, according to one or more embodiments.

Turning now to FIG. 9, exemplary GUI 900 depicts a non-limiting example implementation of a "Wave" simulation game/activity. In essence, the virtual wave may attempt to simulate the experience of a real-life wave activity that customarily occurs at many live events (e.g., at a sporting match where sections of a stadium sequentially rise and sit down to simulate the movement of an ocean wave). This activity may be dynamically implemented by the computer server 115 at various points throughout the enhanced live event. For instance, the activity may be implemented during detection that a commercial is occurring. Alternatively, as another example, the activity may be implemented responsive to detecting that there is a lull in the game (e.g., a timeout has been called in a game, etc.). During implementation of the wave activity, avatar icons 905 associated with the user profiles of some or all participants in a virtual media streaming session may be presented on the screen. In situations where the virtual media streaming session contains a large number of people, the computer server 115 may dynamically partition the large group into subsets of a predetermined size (e.g., 20 individuals) in an effort to not overly saturate a user's screen with avatar icons 905. As the wave sequentially proceeds around the presented avatar icons 905 (e.g., in a clockwise or counterclockwise circle, etc.), a visual effect (e.g., a highlighting, a blinking, another type of animation or visual affect, etc.) may be implemented on the current avatar icon 910 where the wave is located. To participate in the facilitation of movement of the wave, a notification icon 915 may appear on a user's screen when it is their turn to participate (i.e., when the current avatar icon 910 is next to the user's avatar icon 920). The notification icon 915 may provide an indication of a button or icon they can press on their input device (e.g., remote, keyboard, smartphone, etc.) to initiate transfer of the "wave" from the current avatar icon 910 to the user's avatar icon 920.

Figure 10:
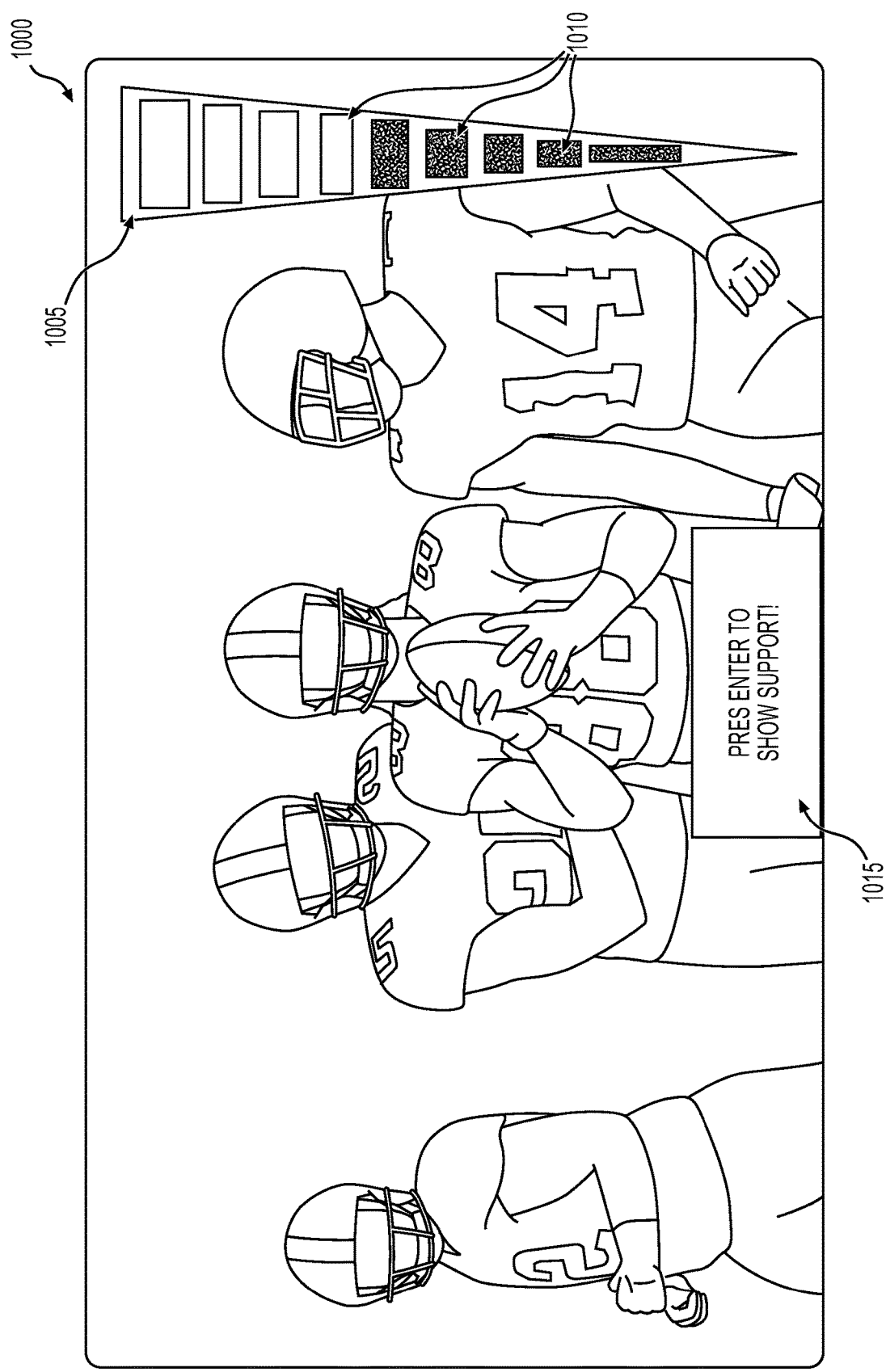
FIG. 10 depicts another exemplary interactive graphical user interface (GUI) for engaging in a joint experience, according to one or more embodiments.

Turning now to FIG. 10, exemplary GUI 1000 depicts a non-limiting exemplary implementation of a "Support Meter" activity. In essence, the support meter activity may attempt to simulate the involvedness of a real-life crowd at a live event via virtual means. More particularly, a support meter 1005 may be provided that includes a plurality of support bars 1010. As engagement with the live event increases (e.g., due to exciting occurrences in the live event, etc.), a visual affect (e.g., a highlighting, a filling in, etc.) may be successively implemented on the support bars 1010 (i.e., as engagement increases, more of the support bars 1010 are visually affected). In an embodiment, the support meter activity may be dynamically implemented by the computer server 115 at various points throughout the enhanced live event. For instance, in the case of American football, the support meter 1005 may appear on key plays (e.g., third or fourth down plays, etc.). In an embodiment, the support meter may be presented to some or all participants in the virtual media streaming session. For instance, with respect to the former, the support meter 1005 may only be presented to the fans of a team that is approaching a key milestone, e.g., trying to get a defensive stop on third down (i.e., assuming the computer server 115 is able to identify the fans of each team based on available context data and/or participant designations). With respect to the latter, separate support meters 1005 may be presented to fans of both teams at a key milestone, such as on a third down. In an embodiment, participants may influence the amount of support bars 1010 that are visually affected in the support meter 1005 by pressing a support icon 1015 appearing on their screens. The support icon 1015 may provide an indication of a button or icon the participants can press on their input device to show their support. In an embodiment, participants may be instructed to interact with the support icon 1015 once to show support or, alternatively, may be instructed to interact with the support icon 1015 repeatedly to show increased support.

Figure 11:
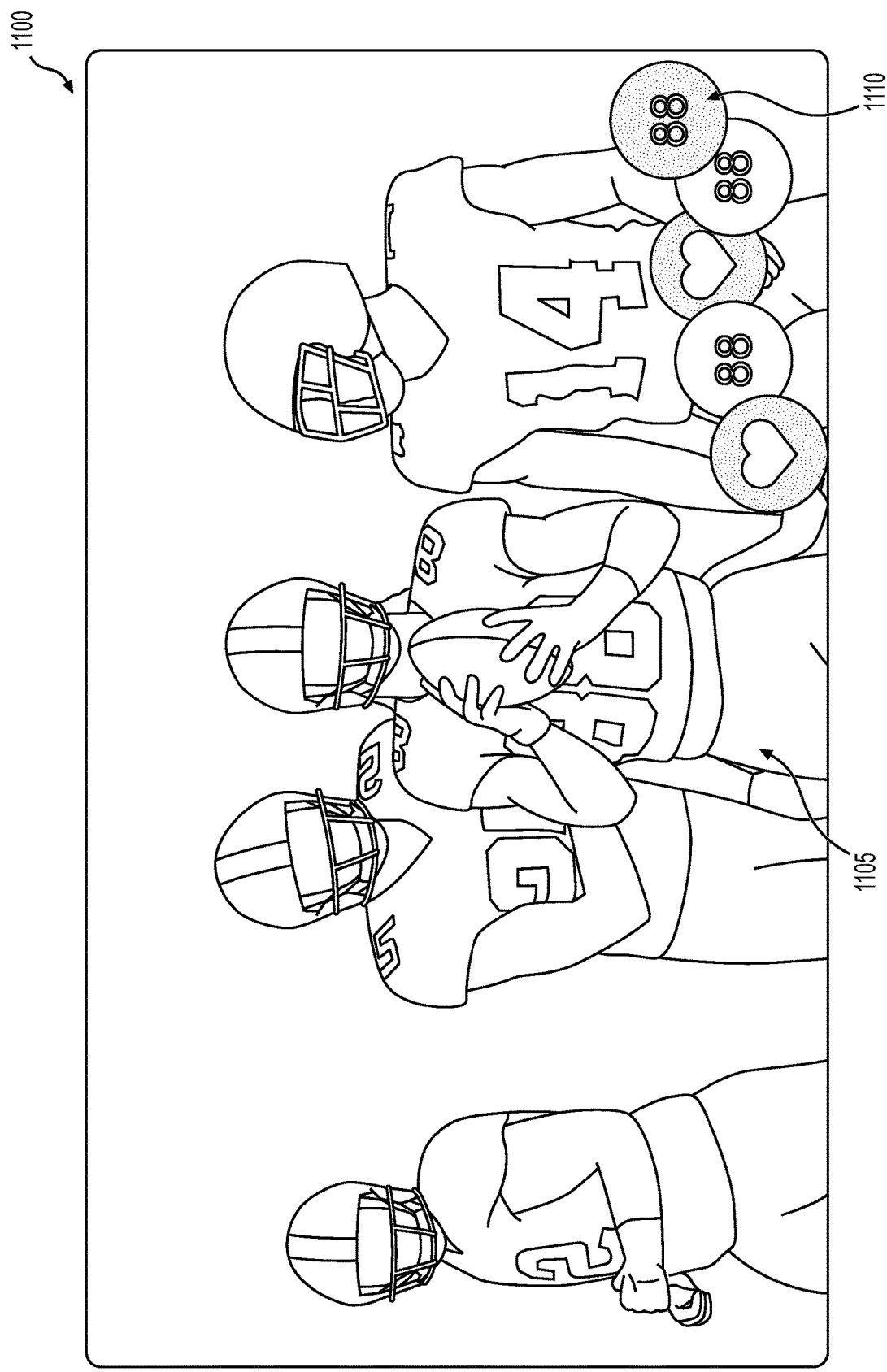
FIG. 11 depicts another exemplary interactive graphical user interface (GUI) for engaging in a joint experience, according to one or more embodiments.

Turning now to FIG. 11, exemplary GUI 1100 depicts a non-limiting exemplary implementation of dynamically created reactions. Generally, participants to the live enhanced broadcast may select from one or more static, preconfigured reactions, as illustrated in FIGS. 4 and 7. However, in one or more embodiments, the computer server 115 may dynamically create emotive reactions based upon occurrences in the enhanced live stream. For instance, the computer server 115 may glean information about the live event and may utilize that information to dynamically create, or make modifications to, selectable emoticon reactions in an emoticon bank. Occurrences in the live event that may drive creation of these dynamic reactions include: when a player has just made a great play (e.g., a player that has scored points for their team, a player that has made a great defensive play, etc.), when a player is injured, when a particular topic is mentioned or player is discussed, and the like. As a non-limiting example of the foregoing, the computer server 115 may receive indications that uniformed player 88 1105 depicted in GUI 1100 just made a great play. Subsequently, the computer server 115 may create a dynamic emotive reaction 1110 of the player's jersey number that may be selectable as input by the participants in the virtual media streaming session.

Figure 12:
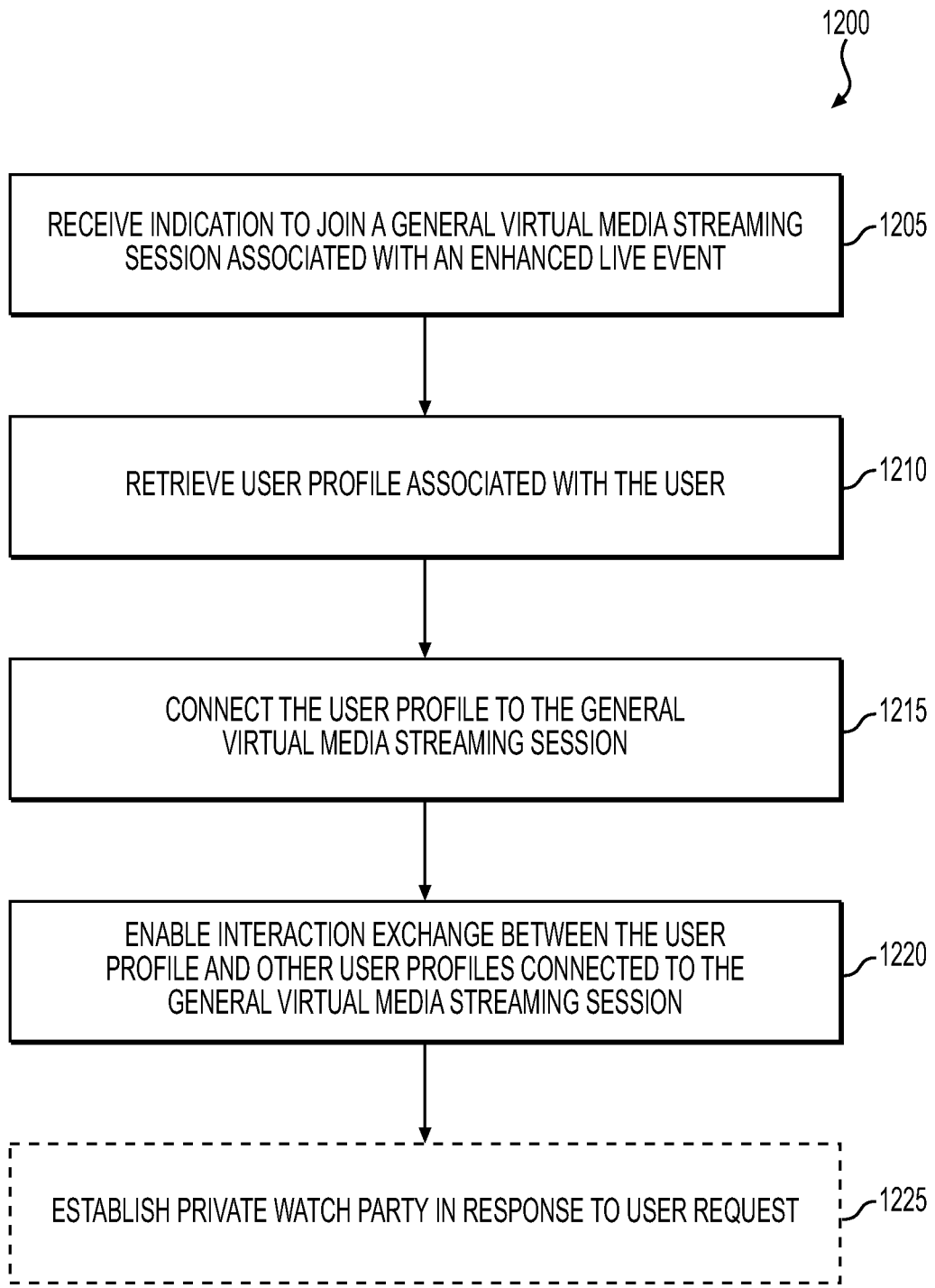
FIG. 12 depicts an exemplary flowchart of a method of enabling interaction exchange between users in a virtual media streaming session associated with an enhanced live event, according to one or more embodiments.

FIG. 12 is a flowchart illustrating an exemplary method 1200 for enabling interactions between user profiles connected to a virtual media streaming session associated with an enhanced live event. The method 1200 may be performed by computer server 115 (shown in FIG. 1).

Step 1205 may include receiving, at computer server 115, an indication from a user to join a general virtual media streaming session associated with an enhanced live event. Step 1210 may include retrieving a user profile associated with the user from an accessible database. In an embodiment, the user profile may identify one or more devices associated with the user. Step 1215 may include connecting the user profile of the user to the general virtual media streaming session. The general virtual media streaming session may contain user profiles of one or more other users. Step 1220 may include enabling interaction exchange between the connected user profiles in the general virtual media streaming session. For instance, the connected user profiles may provide comments and/or emotive reactions that may be seen by others in the general virtual media streaming session. Additionally, the connected user profiles may be exposed to one or more types of joint experiences that are based on occurrences in the enhanced live event (e.g., games, activities, opportunities to provide dynamically modified inputs, etc.). Exemplary method 1200 may optionally include step 1225, which may include establishing, in response to a user request, a private watch party. The private watch party may contain one or more other user profiles invited to the private watch party by the user. In addition to receiving exposure to the comments, reactions, and/or joint experiences that others in the general virtual media streaming session are exposed to, the private watch party participants may communicate between themselves privately (i.e., any shared input in the private watch party is not visible to the user profiles in the general virtual media streaming session).

Further aspects of the disclosure are discussed in the additional embodiments below. It should be understood that embodiments in this disclosure are exemplary only, and that other embodiments may include various combinations of features from other embodiments, as well as additional or fewer features.

In general, any process discussed in this disclosure that is understood to be computer-implementable, such as the process illustrated in FIG. 12, may be performed by one or more processors of a computer server, such as computer server 115, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as computer server 115, may include one or more computing devices. If the one or more processors of the computer system are implemented as a plurality of processors, the plurality of processors may be included in a single computing device or distributed among a plurality of computing devices. If a computer server 115 comprises a plurality of computing devices, the memory of the computer server 115 may include the respective memory of each computing device of the plurality of computing devices.

Figure 13:
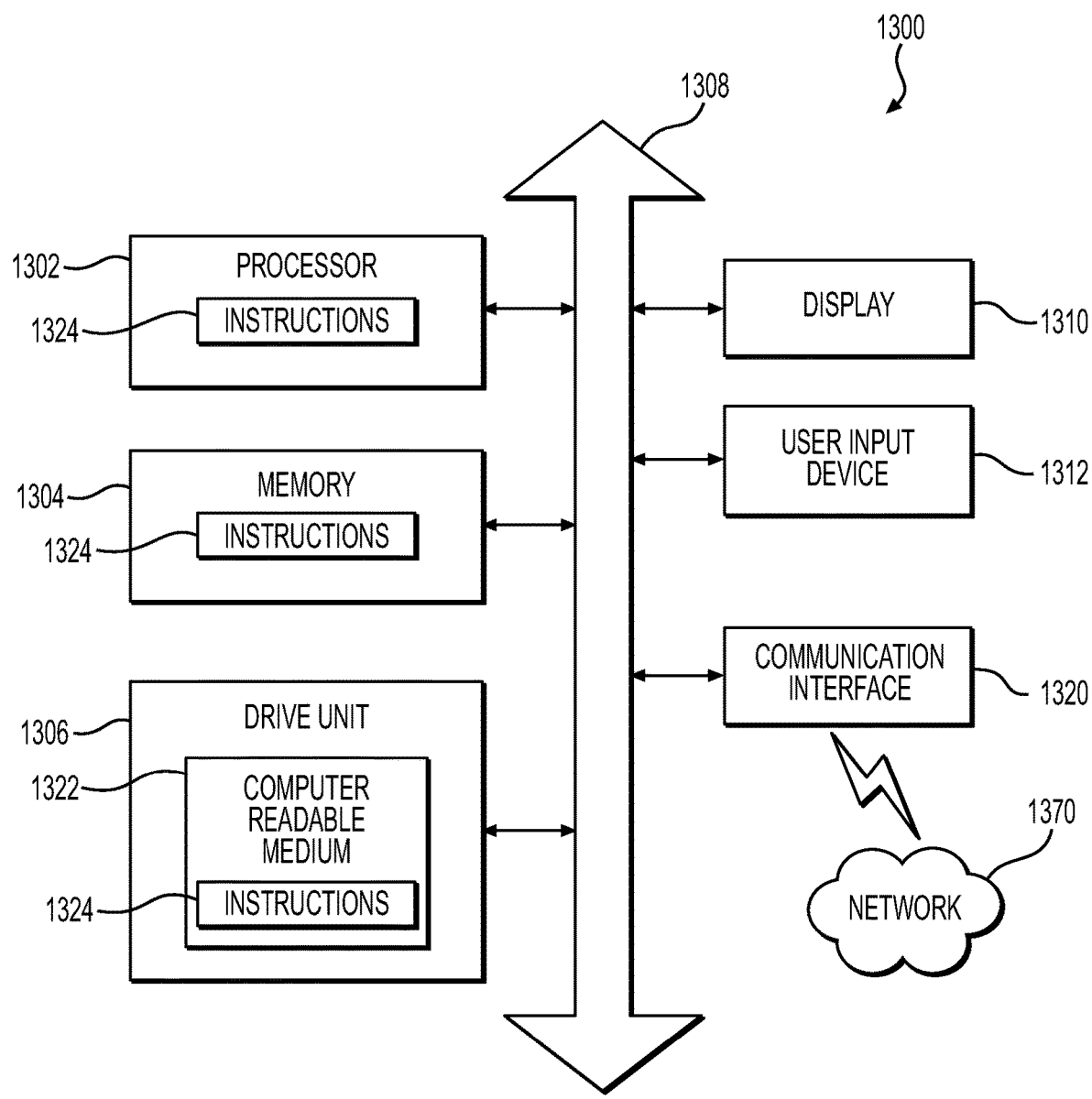
FIG. 13 depicts an exemplary computer server, according to one or more embodiments.

FIG. 13 is a simplified functional block diagram of a computer system 1300 that may be configured as a computing device for executing the process illustrated in FIG. 12, according to exemplary embodiments of the present disclosure. FIG. 13 is a simplified functional block diagram of a computer that may be configured as the computer server 115 according to exemplary embodiments of the present disclosure. In various embodiments, any of the systems herein may be an assembly of hardware including, for example, a data communication interface 1320 for packet data communication. The platform also may include a central processing unit ("CPU") 1302, in the form of one or more processors, for executing program instructions. The platform may include an internal communication bus 1308, and a storage unit 1306 (such as ROM, HDD, SDD, etc.) that may store data on a computer readable medium 1322, although the system 1300 may receive programming and data via network communications. The system 1300 may also have a memory 1304 (such as RAM) storing instructions 1324 for executing techniques presented herein, although the instructions 1324 may be stored temporarily or permanently within other modules of system 1300 (e.g., processor 1302 and/or computer readable medium 1322). The system 1300 also may include input and output ports 1312 and/or a display 1310 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to synchronous consumption of streaming media, it should be appreciated that the presently disclosed embodiments may be applicable to transmitting data and may be applicable to any environment, such as a desktop or laptop computer, a gaming console environment, and any CTV (connected TV) environment (e.g., an internet-connected device used to watch live multimedia content items), etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the process shown in FIG. 12, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for interacting with a live multimedia stream using a server in network communication with at least one database, the method comprising operations including:

presenting, using a processor associated with the server and for user selection on a multimedia streaming platform associated with the server, a plurality of live media streaming options, wherein at least a subset of the plurality of live media streaming options comprise one or more features enabling enhanced interaction between users;

receiving, from a first user device associated with a first user, an indication to join a general virtual media streaming session associated with one of the at least the subset;

retrieving, using a processor associated with the server and subsequent to the receiving and from the at least one database, a first user profile associated with the first user;

connecting, using the processor and subsequent to the retrieving, the first user profile to the general virtual media streaming session;

transmitting, using the processor and to the first user device via the multimedia streaming platform, the live multimedia stream playing in the virtual media streaming session;

initiating, using the processor, a private chat session within the general virtual media streaming session responsive to detection of a private chat session initiation request from the first user;

identifying, using the processor and subsequent to the initiating, that another user profile has connected to the private chat session;

determining, using the processor, whether a predetermined number of notable events have occurred in the private chat session prior to the another user profile connecting to the private chat session, wherein any of the predetermined number of notable events correspond to one of: a communication, a conversation topic, and a reaction; and providing, using the processor and to the another user profile and responsive to determining that the predetermined number of notable events have occurred, a stitched highlight reel comprising indications of each of the notable events.

2. The method of claim 1, wherein the live multimedia stream is simultaneously viewable from each user profile connected to the general virtual media streaming session.

3. The method of claim 1, wherein each of the at least the subset of the plurality of live media streaming options comprises a visual designation that the one or more features enabling enhanced interaction exist within the virtual media streaming session.

4. The method of claim 1, wherein the one or more features comprise a joint experience occurring in the general virtual media streaming session.

5. The method of claim 4, wherein the joint experience is a type of joint experience selected from the group consisting of: a game, an activity, and an interaction modification.

6. The method of claim 1, further comprising implementing at least one of the one or more features in the virtual media streaming session, wherein the implementing the at least one of the one or more features further comprises:

analyzing content presented in the live multimedia stream;

identifying a predetermined event occurring within the content that triggers initiation of the joint experience; and selecting, based on a context of the predetermined event, a type of the joint experience to initiate in the general virtual media streaming session.

7. The method of claim 1, wherein the initiating the private chat session further comprises:

receiving, from the first user device, a request to invite one or more other users to the private chat session within the general virtual media streaming session;

transmitting, subsequent to the receiving the request, an invitation to join the private chat session to one or more designated user profiles associated with the one or more users; and connecting each of the one or more designated user profiles for which acceptance of the invitation was detected to the private chat session.

8. The method of claim 1, wherein input exchanged between the one or more designated user profiles connected to the private chat session is not visible to the other user profiles connected only to the general virtual media streaming session.

9. The method of claim 1, wherein the private chat session comprises a selectable option configured to enable each of the one or more designated user profiles connected to the private chat session to cycle between a private party chat associated with the private chat session and an event chat associated with the general virtual media streaming session.

10. A system for interacting with a live multimedia stream, the system comprising:
a processor;
at least one database;
a server in network communication with the at least one database and the processor, the server storing instructions that are executable by the processor to:
present, for user selection on a multimedia streaming platform associated with the server, a plurality of live media streaming options, wherein at least a subset of the plurality of live media streaming options comprise one or more features enabling enhanced interaction between users;
receive, from a first user device associated with a first user, an indication to join a general virtual media streaming session associated with one of the at least the subset;
retrieve, subsequent to the receiving and from the at least one database, a first user profile associated with the first user;
connect, subsequent to the retrieving, the first user profile to the general virtual media streaming session;
transmit, to the first user device via the multimedia streaming platform, the live multimedia stream playing in the virtual media streaming session;
initiate a private chat session within the general virtual media streaming session responsive to detection of a private chat session initiation request from the first user;
identify, subsequent to the initiating, that another user profile has connected to the private chat session;
determine whether a predetermined number of notable events have occurred in the private chat session prior to the another user profile connecting to the private chat session, wherein any of the predetermined number of notable events correspond to one of: a communication, a conversation topic, and a reaction; and
provide, to the another user profile and responsive to determining that the predetermined number of notable events have occurred, a stitched highlight reel comprising indications of each of the notable events.

11. The system of claim 10, wherein each of the at least the subset of the plurality of live media streaming options comprises a visual designation that the one or more features enabling enhanced interaction exist within the virtual media streaming session.

12. The system of claim 10, wherein the one or more features comprises a joint experience occurring in the general virtual media streaming session.

13. The system of claim 12, wherein the joint experience is a type of joint experience selected from the group consisting of: a game, an activity, and an interaction modification.

14. The system of claim 10, wherein the instructions are further executable by the processor to implement at least one of the one or more features in the virtual media streaming session, and wherein the instructions executable by the processor to implement are further configured to cause the processor to:
analyze content presented in the live multimedia stream;
identify a predetermined event occurring within the content that triggers initiation of the joint experience; and
select, based on a context of the predetermined event, a type of the joint experience to initiate in the general virtual media streaming session.

15. The system of claim 10, wherein the instructions executable by the processor to initiate the private chat session are further configured to cause the processor to:
receive, from the first user device, a request to invite one or more other users to the private chat session within the general virtual media streaming session;
transmit, subsequent to the receiving the request, an invitation to join the private chat session to one or more designated user profiles associated with the one or more users; and
connect each of the one or more designated user profiles for which acceptance of the invitation was detected to the private chat session.

16. The system of claim 10, wherein input exchanged between the one or more designated user profiles connected to the private chat session is not visible to the other user profiles connected only to the general virtual media streaming session.

17. The system of claim 10, wherein the private chat session comprises a selectable option configured to enable each of the one or more designated user profiles connected to the private chat session to cycle between a private party chat associated with the private chat session and an event chat associated with the general virtual media streaming session.

18. A non-transitory computer-readable medium storing computer-executable instructions which, when executed by a server in network communication with at least one database, cause the server to perform operations comprising:
presenting, for user selection on a multimedia streaming platform associated with the server, a plurality of live media streaming options, wherein at least a subset of the plurality of live media streaming options comprise one or more features enabling enhanced interaction between users;
receiving, from a first user device associated with a first user, an indication to join a general virtual media streaming session associated with one of the at least the subset;
retrieving, subsequent to the receiving and from the at least one database, a first user profile associated with the first user;
connecting, subsequent to the retrieving, the first user profile to the general virtual media streaming session;

transmitting, to the first user device via the multimedia streaming platform, the live multimedia stream playing in the virtual media streaming session;

initiating a private chat session within the general virtual media streaming session responsive to detection of a private chat session initiation request from the first user;

identifying, subsequent to the initiating, that another user profile has connected to the private chat session;

determining whether a predetermined number of notable events have occurred in the private chat session prior to the another user profile connecting to the private chat session, wherein any of the predetermined number of notable events correspond to one of: a communication, a conversation topic, and a reaction; and providing, to the another user profile and responsive to determining that the predetermined number of notable events have occurred, a stitched highlight reel comprising indications of each of the notable events.

* * * * *